United States Patent

[11] 3,617,994

[72] Inventors William E. Glenn, Jr.
140 Bentwood Drive;
Frank B. Gorman, 276 East Hunting Ridge Road, both of Stamford, Conn. 06903
[21] Appl. No. 794,560
[22] Filed Jan. 28, 1969
[45] Patented Nov. 2, 1971

[54] SONOGRAPHY SYSTEM
15 Claims, 6 Drawing Figs.
[52] U.S. Cl. .................................................. 340/3, 340/5, 181/0.5
[51] Int. Cl. ....................................................... G01s 9/66
[50] Field of Search .......................................... 340/1, 3, 5 H; 181/.5

[56] References Cited
OTHER REFERENCES
Greguss, The Journal of Photographic Science, Vol. 14, Nov./Dec. 1966 pp. 329– 332

Primary Examiner—Richard A. Farley
Attorney—Brumbaugh, Graves, Donohue & Raymond ABSTRACT: As described herein, an object field is simultaneously illuminated by acoustic waves having different frequencies and the waves reflected off objects in the field are recorded by a plurality of hydrophones arranged in a circular array and supplied as voltage signals to a plurality of tuned circuits. The tuned circuits separate the different frequency components of the developed signals and supply the component signals, either sequentially through a scanning network to a mixer circuit wherein the component signals are combined with a reference signal having frequencies equal to the frequencies of the separated component signals and selectively out-of-phase therewith, or to a plurality of mixer circuits wherein the component signals are combined with reference signals having frequencies equal to the frequencies of the separated component signals and selectively out-of-phase therewith. The combined signals are then supplied sequentially to a recording apparatus which records the signals on thermoplastic film in differently dimensioned patterns which correspond to the hydrophone array.

INVENTORS
WILLIAM E. GLENN, JR. &
BY FRANK B. GORMAN their ATTORNEYS

INVENTORS
WILLIAM E. GLENN, JR. &
FRANK B. GORMAN

SONOGRAPHY SYSTEM

BACKGROUND OF THE INVENTION

The present invention relates to sonography systems which employ holographic techniques to obtain a visual reproduction of an object field.

A patent application, entitled "Sonar System Employing Holographic Techniques to Produce a Picture of an Object Field," Ser. No. 664,415, filed Aug. 30, 1967 and assigned to the assignee of the present invention, describes a sonography system having an acoustic wave transmitter which emits a narrow acoustic wave beam for scanning an object field. The information carrying waves from a plurality of points in the object field are sensed by a plurality of hydrophones arranged in a ringlike array and supplied as voltage signals to a plurality of mixer circuits. In each mixer circuit, each developed signal is modulated by a reference signal having a frequency of the transmitted acoustic wave and out-of-phase with each signal by half the field angle scanned by the acoustic wave.

The joint intensity signals supplied from the mixer circuits are then integrated and the reafter supplied to a plurality of magnetic actuators which modulate the light emitted by a mercury lamp in proportion to the amplitudes of the joint intensity signals. The modulated light is then focused onto a photographic film strip at a greatly reduced scale to record a sonogram corresponding to the information in each portion of the scanned object field. After the film is developed, a laser beam illuminates the film to optically reconstruct all the sonograms recorded in a predetermined period of time.

To obtain the same angles in the visual reproduction of the sonograms, as in the original recording by the hydrophones, it would be necessary to make the diameter of each sonogram approximately 100,000 times smaller than the diameter of the hydrophone ring. This is true because the ratio between the wavelengths of sound waves and the wavelengths of light waves may be as high as 100,000 to 1. Such a reduction in sonogram diameter is not practical, however, and a compromise is made; the diameter of the sonogram is made approximately 1,000 times smaller than the diameter of the hydrophone ring.

It quite often occurs that a particular object field contains a larger number of targets. Heretofore, it has been thought necessary to increase the number of hydrophones in order to develop information concerning all the targets in the area, there being required approximately four hydrophones for each target in the object field. It has been proposed, for example, that concentrically arranged hydrophone rings be provided to increase the resolution of the sonograms by recording all phases of the waves reflected off the targets in the scanned object field.

SUMMARY OF THE INVENTION

Accordingly, it is an object of the present invention to increase the resolution of the sonograms recorded in a sonography system without increasing the number of recording hydrophones.

This and other objects of the present invention are accomplished by simultaneously illuminating a target area with acoustic waves of different frequencies and thereafter separating the different frequency components of the signals developed by a plurality of reflected object wave responsive sound intensity receptors. The separated component signals are then combined with reference signals developed by a selected one of the plurality of sound intensity receptors having frequencies equal to the frequencies of the separated component signals and selectively out-of-phase therewith. The combined signals are then recorded on a storage medium in arrays corresponding to the array of sound intensity receptors, the arrays having dimensions corresponding to the different frequency components of the reflected waves.

In one preferred embodiment of the invention, the different frequency components are sequentially scanned by a scanning network, combined with corresponding frequency components of the reference signal and thereafter recorded in concentric circles on thermoplastic film. In another preferred embodiment of the instant invention, tunable filters are provided to separate the different frequency components of the recorded signals and the separated frequency components are combined in a plurality of mixer circuits with the corresponding frequency components of the reference signal. The combined signals are then detected and supplied to a switching network which samples each of the combined signals and supplies the signals to a recording apparatus which spirally records the signals on thermoplastic film.

DESCRIPTION OF THE PREFERRED EMBODIMENT

Figure 1:
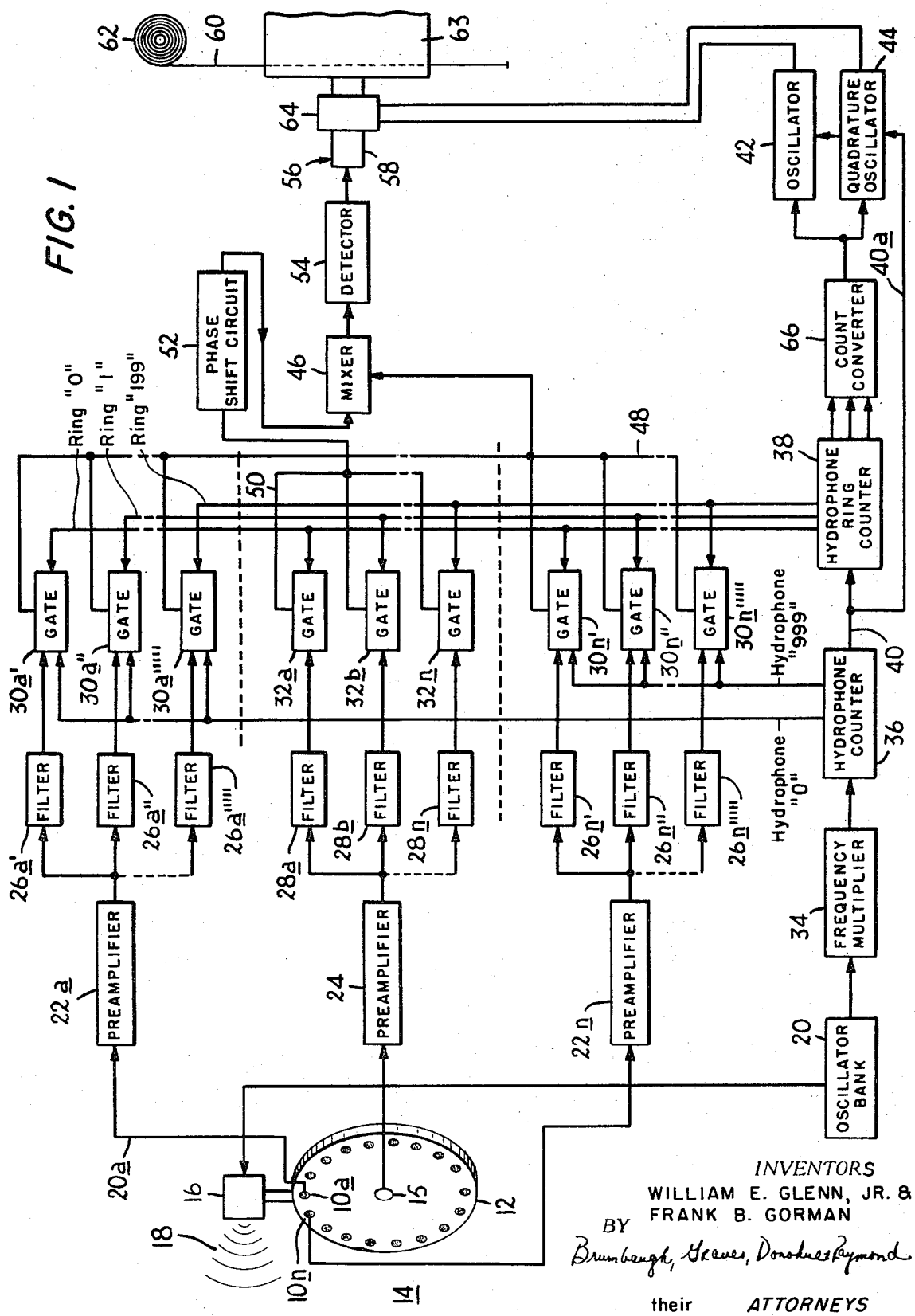
FIG. 1 illustrates schematically a first representative sonography system arranged according to the present invention.

In a first representative sonography system arranged according to the present invention, as shown in FIG. 1, a plurality of sound intensity receptors 10a–10n, which may be hydrophones, are arranged in a circular array 12 and are disposed such that each hydrophone faces an object filed 14. Also provided is a centrally disposed hydrophone 15. Depending on the application of the present invention, the hydrophones 10a10n may be secured, for example, to the forward end of a submerged vessel, such as a bathysphere. As is understood, the hydrophones 10a–10n, which may be of conventional construction, are responsive to acoustic waves and derive voltage signals corresponding to the intensity of the acoustic waves.

Displaced from the hydrophones 10a–10n and movable therewith is an illuminating transducer 16 which emits a plurality of acoustic wave beams 18 to illuminate the object field 14. An oscillator bank 20, comprising, for example, a plurality of oscillators of conventional construction, drives the transducer 16. In a preferred embodiment, the oscillator bank 20 provides signals having frequency components ranging from 20 to 200 kHz. in increments of 1 kHz. to the transducer 16.

All the hydrophones in the array 12 are responsive to the waves reflected from all the points in the object field 14. To obtain a visual reproduction of a complicated object field, from 20,000 to 200,000 image points are required. To satisfy this minimum requirement and in accordance with the present invention, the array 12 may comprise one circular hydrophone array comprising, for example, 1000 hydrophones. As will be explained in detail herein, because the transducer 16 emits wave beams having multiple frequencies and the hydrophones 10a–10n record the reflected waves having these multiple frequencies, the 1000 hydrophones are effective to simulate the actual presence of 200,000 hydrophones arranged in concentric arrays. The acoustic wave beams 18 emitted by the transducer 16 illuminate the object field 14 and the waves reflected by all the points in the illuminated field 14 are sensed by the hydrophones 10a–10n. The voltage signals developed by the hydrophones 10a–10n, and corresponding to the intensities of the reflected waves, are coupled through a plurality of conductors 20a–20n, respectively, to a corresponding number of preamplifiers 22a–22n, respectively. The voltage signals developed by the centrally disposed hydrophone 15 are supplied to a preamplifier 24. After amplification, the voltage signals developed by each of the preamplifiers 22a–22n are supplied to a plurality of filter circuits 26a'–26a''''', –26n'–26n'''''. The voltage signals developed by the preamplifier 24 are similarly supplied to a plurality of filters 28a–28n. The filter circuits 26a'–26a ''''', –26n–''''' and the filter circuits 28a' 28n are arranged to transmit only those signals within predetermined frequency ranges. For example, the filters 26a'–26n ' and the filter 28a may be arranged to transmit signals in the range from 20 to 21 kHz. The filters 26a'''''–26n ''''' and the filter 28n may be arranged, for example, to transmit only those signals in the range from 199 to 200 kHz.

Coupled to the output terminals of the filter circuits 26a'–26a''''', –26n''''' are the input terminals of a corresponding plurality of gate circuits 30a'–30a'''''–30n'''''. The filter circuits 28a–28n are similarly coupled to the input terminals of a plurality of gate circuits 32a–32n, respectively. The gate circuits 30a'–30a''''' and the gate circuits 32a–32n, which may be, for example, AND gates comprising a plurality of input terminals, transmit the selectively transmitted voltage signals when signals of proper phase and amplitude are supplied to the remaining input terminals thereof. As will be described hereinbelow, the gate circuits 30a'–30a''''',–30n'–30n''''' and 32a–32n are selectively and sequentially enabled by a scanning arrangement which generates "hydrophone" and "-hydrophone ring" scanning signals.

As above-mentioned, the oscillator bank 20 may comprise a plurality of oscillators operating at frequencies ranging between 20 and 200 kHz. The signals generated by the oscillator bank 20 are in turn employed to drive the transducer 16 to admit the acoustic wave beams 18 having frequency components between the range of 20 and 200 kHz. A selected frequency component signal, for example a 100 kHz. signal developed by the oscillator bank 20, is also supplied to a frequency multiplier 34 which may be of conventional construction and, accordingly, increases the frequency of the input signals by a selected factor. For example, where the signal supplied to the multiplier 34 has a frequency of 100 kHz., the output signals developed by the multiplier 34 may have a frequency of 667 kHz.

From multiplier 34, the increased frequency signals are supplied to the input terminal of a hydrophone counter 36 which may be, for example, a binary counter. In response to the signals supplied to it from the multiplier 34, the counter 36 accumulates a count of 1000 before resetting. As is understood, to accumulate a count of 1000 (0 –999) the counter requires only 10 bistable devices. To decode the count in the counter 36 as it is being accumulated, a decoding network may be provided or, as shown, the appropriate stages of the counter 36 may be coupled selectively to the gate circuits 30a'–30a '''' ',–30n–30n'''''. Specifically, to enable the gate circuits 30a'–30a''''', which are operatively coupled to the first hydrophone 10a in the array 12, it is necessary to couple all ten stages of the counter 36 to the gate circuits 30a'–30a'''''. To enable the gate circuits 30n'–30n''''', which is enabled when the counter has a count of "999," it is necessary to couple all the stages, with the exception of the fourth and fifth stages of the counter 36 to the gate circuits, as may be understood, For the sake of clarity, only one conductor is shown leading from the hydrophone counter 36 to the appropriate gate circuits, each conductor being labeled hydrophone "O," hydrophone "1 "–hydrophone "999."

Upon resetting, the counter 36 emits a pulse which is supplied to a hydrophone ring counter 38 via a conductor 40 and to pair of oscillators 42 and 44 operating in phase quadrature via a conductor 40a. The count accumulated by the hydrophone ring counter 38 corresponds to the number of selected frequency components in the acoustic waves 18 emitted by the transducers 16. Inasmuch as there are preferably 200 different frequency components, the counter 38 has capacity for accumulating a count of 200 , i.e., O–199. To accumulate a count of 200, only eight bistable devices are required for the counter 38. As shown, the gate circuits 30a'–30n' correspond to a first hydrophone ring which is responsive to the frequency components of the developed signals in the range from 20 to 21 kHz. The gate circuits30a''–30n'' are responsive to the signals in the range between 21 and 22 kHz., and the gate circuits 30a'''''–30n''''' are responsive to those signals in the range between 199 and 200 kHz. Again, to decode the count in the counter 38 as it is being accumulated, a decoding network may be provided or, as shown, the appropriate stages of the counter 38 may be coupled selectively to the gate circuits 30a'–30a''''',–30n'–30n'''''. Specifically, to enable the gates 30a'–30n', which are enabled when the counter 38 has a zero count, it is again necessary to couple all eight stages of the counter 38 to these gates. To enable the gates 30a'''''–30n''''', which are enabled when the counter has a count of 199 accumulated therein, it is necessary to couple all the stages, with the exception of stages four, five and six, to these gate circuits. In addition to decoding several simulated hydrophone rings by selectively enabling the gate circuits 30a'–30n',–30a'''''–30n''''', the appropriate output terminals of the counter 38 are also supplied to the other input terminals of the gate circuits 32a–32n. Again, the gate circuit 32a is enabled when the hydrophone counter 38 has a count of 0 therein, which corresponds to the development of a signal by the hydrophone 15 having a frequency of 20 kHz. The gate circuit 32b is enabled when the developed signal has a frequency of 21 kHz. and the gate circuit 32n is enabled when a frequency component of 199 kHz. is received.

In view of the foregoing it can be seen that the gate circuits 30a'–30n' will sequentially traNsmit the frequency components of the developed signals having frequencies ranging between 20 and 21 kHz. and that the gate circuit 32a will continually transmit this frequency component signal, hereinafter referred to as a reference signal. Following the sequential transmission of these signals, the gate circuits 30a''–30n'' are enabled by the hydrophone ring counter 38 and these gate circuits transmit those developed signals having frequencies ranging between 21 and 22 kHz. At the same time, the gate circuit 32b will be enabled and transmit a reference signal having frequencies ranging between 21 and 22 kHz.

The output terminals of the gate circuits 30a'–30a''''',–30n '–30n''''' are coupled together and coupled to the input terminal of a mixer circuit 46 by a conductor 48. A conductor 50 couples the output terminal of the gate circuits 32a–32n together and to the input terminal of a phase shift circuit 52. In turn, the output terminal of the phase shift circuit 52 is coupled to another input terminal of the mixer circuit 46. The phase shift circuit 52, which may be of conventional construction and accordingly need not be described herein, operates to change the phase of the developed reference signals relative to the signals transmitted by the gate circuits 30a'–30a''''',–30n '–30n''''' by a selected amount, such as for example 30°. The phase shifted reference signals developed by the circuit 52 simulate the angular impingement upon the hydrophones 10a–10 of a reference acoustic wave. This simulated reference acoustic wave corresponds to the reference light wave employed in light optical holography, as will be apparent hereinbelow In the mixer circuit 46, which may be of conventional construction, the sequentially transmitted voltage signals developed by the hydrophones 10a–10n are combined with the out-of-phase reference signals produced by the variable phase shift circuit 52. Sequential output signals are then produced by the mixer circuit 46 which are proportional to the joint intensity of the reflected object acoustic waves and the simulated reference acoustic wave. In other words, signals are produced which are proportional to the square of the sum of the amplitudes of the out-of-phase reference signals and the amplitudes of the signals produced by the hydrophones. In this manner, the interference pattern which is generated on a photographic plate by converging reference and image carrying light beams in light optical holography is simulated.

From the mixer circuit 46, the joint intensity signals are supplied to a detector 54 which develops DC control signals which are proportional to the magnitude of the joint intensity signals. Thereafter, the control signals are supplied to recording apparatus for recording the signals on thermoplastic film in a pattern corresponding to the array which would have been recorded if the array 12 has comprised a plurality of concentrically arranged hydrophone rings.

For typical recording apparatus which may be used in the instant invention, reference may be had to U.S. Pat. No. 3,113,179 entitled "Method and Apparatus for Recording," issued in the name of W. E. Glenn, Jr., a coapplicant in the matter of the present patent application. Generally, the apparatus includes a chamber 56 which is substantially evacuated of gases and vapors and which includes an electron beam assembly 58. Also provided is a film assembly which comprises thermoplastic film 60 which passes from a supply reel 62 through a chamber 63 to a takeup reel (not shown). In the chamber 63, the thermoplastic film is first heated, then subjected to the electron beam generated in the assembly 58 and thereafter cooled.

In the electron beam assembly 58, the cathode electrode may be heated by a filament and the anode electrode (not shown), provided with a small centrally located rectangular hole, may function to accelerate and modulate the electron beam in typical control electrode fashion. Consequently, the detected input signals can be impressed upon the beam by applying them to the anode electrode. Preferably, however, the input signals are supplied to a pair of auxiliary deflection plates (not shown) which, in conjunction with the primary deflection structure 64 described hereinafter, momentarily slow the speed and even halt the deflection of the beam. Thus the beam will pause at points on the film 60 for times of function of the amplitude of the detected input signals.

The deflection yoke 64 mounted on the assembly 58 focuses the electron beam to converge on the thermoplastic film 60 in a circular array. To this end, each stage of the hydrophone ring counter 38 is coupled to a count converter circuit 66 which produces a control signal having an amplitude which is proportional to the count accumulated in the counter 38. In particular, the amplitude of the signal generated by the converter circuit 66 increases as the count in the counter 38 increases. Such converter circuits are conventional and, accordingly, need not be described herein.

Figure 2:
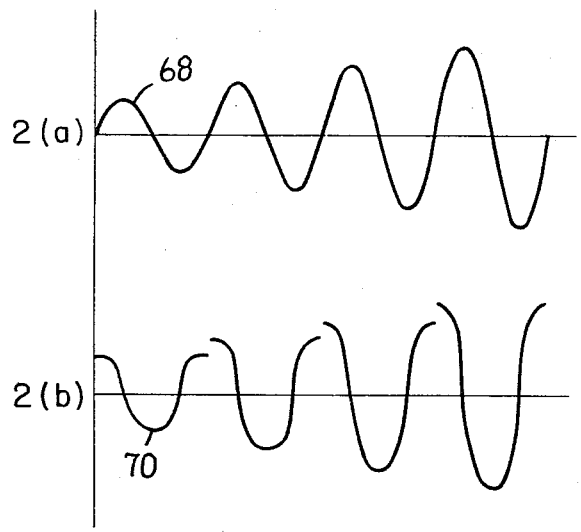
FIG. 2 is a graphic illustration of wave forms useful in explaining the operation of the FIG. 1 sonography system.
Figure 3:
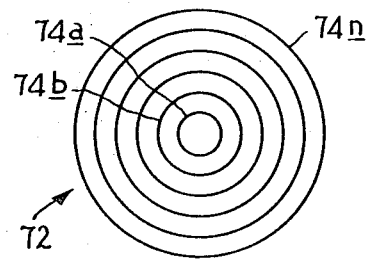
FIG. 3 illustrates graphically the sonograms recorded on film by the FIG. 1 sonography system.

The signal developed by the converter network 66 is supplied simultaneously to the pair of oscillators 42 and 44 which operate in phase quadrature and at frequencies of approximately 667 cycles per second. The magnitudes of the signals generated by the oscillators 42 and 44 are dependent upon the magnitudes of the control signals supplied by the count converter circuit 66. Referring now to FIG. 2, it can be seen that the oscillator 42 generates a sine wave 68 having an amplitude which increases during each successive cycle and the oscillator 44 generates a cosine signal 70 having an amplitude which increases by a predetermined amount during each successive cycle. The time of one cycle corresponds to the time it takes the hydrophone counter 36 to accumulate a count of 1000. To maintain the oscillators 42 and 44 operating in synchronism with the count converter network 66 and the sequentially transmitted different frequency component signals, the oscillators are pulsed at the end of each hydrophone scan, by the counter 36. X The output terminals of the oscillators 42 and 44 are coupled to the horizontal and vertical deflection plates, respectively, of the yoke 64. Coupling the sine and cosine signals 68 and 70, respectively, to the horizontal and vertical deflection plates of the scanning yoke 64 causes the electron beam generated in the assembly 58 to circularly scan the thermoplastic film 60. X It can be seen that the magnitudes of the sine and cosine signals 68 and 70 respectively supplied to the yoke 64 increase along with the frequency of the component signals transmitted by the gates $30a'-30a'''''-30n'-30n'''''$. For example, deflection voltage signals having the lowest amplitudes per cycle occur when components having frequencies ranging between 20 and 21 kHz. are sequentially transmitted by the gate circuits $30a'-30n'$. The highest amplitude deflection signals are generated when the gate circuits $30a'''''-30n'''''$ and the gate circuit $32n$ transmit the component signals having frequencies ranging between 199 and 200 kHz. This is true because the ratio between the wavelength of sound waves and the wavelength of light waves decreases as the frequency of the sound waves increases. Accordingly, the necessary reduction in size for each recording is less for high frequency signals than for low frequency signals. This then is the reason for supplying scanning signals having periodically increasing amplitudes to the vertical and deflection plates of the recording apparatus.

When the thermoplastic film 60 is moved to place new film in the path of the electron beam generated by the assembly 58, the thermoplastic coating of the film is heated in the chamber 63 to a liquid state by applied heat. Almost immediately after the film 60 is heated, the molten thermoplastic coating is impinged by the signal electron beam from the assembly 58, which beam is deflected in a circle over the film by the magnetic field from the deflection yoke 64. The number of electrons striking any point on yoke film depends upon the deflection speed and also upon the number of electrons in the beam. Since a high intensity beam is generally desired, the beam is usually modulated by the application of the detected input voltage to auxiliary deflection plates within the assembly 58. Therefore, the deflection speed of the beam in its circular path across the film is a function of the instantaneous magnitude of the input voltage and the number of electrons impinging any point on the film is a function of the same voltage.

The resulting electrons on the film surface are electrostatically attracted toward the film 60 to produce minute depressions in the liquid surface, the depths of which depend upon the number of electrons at any one point. Thus, the depths of the depressions are functions of the amplitudes of the input voltages applied to the auxiliary deflection plates. In other words, the thermoplastic layer undergoes a pattern of thickness deformation which corresponds to the charge pattern on its surface. These deformations are effective to refract or diffract light emanating from the surface of the thermoplastic film so that the recorded information may be read out by an optical system. These depressions would be smoothed out and lost when the film 60 is rewound if it were not for the subsequent cooling of the liquid surface to a substantially solid state by cooling means within the chamber 63. After the film has been cooled, it passes form the chamber 63 to a takeup reel (not shown). The resultant recording or sonogram 72 is shown as comprising a plurality of concentric rings $74a-74$, the radii of the rings increasing with the increase in frequency of the joint intensity signals supplied by the mixer circuit 46.

IT can be seen that the recording 72 of a plurality of concentric circles $74a-74n$, which correspond in number to the number of different frequency components in the waves recorded by the hydrophones $10a-10n$, constitutes a sonogram. The sonogram is the sound equivalent of a light hologram. To reconstruct the sonogram 72, the film 60, in its travel to the takeup reel, may be illuminated by a laser (not shown) to reconstruct the recorded information. A suitable optical reconstruction arrangement is illustrated and described in detail in our copending patent application entitled "Sonography System," Ser. No. 794,564 filed Jan. 28, 1969 and, accordingly, need not be described herein.

In operation, the transducer 16 emits acoustic wave beams 18 having frequency components ranging from 20 to 200 kHz. and the hydrophones $10a-10n$ derive voltage signals which have amplitudes proportional to the intensities of the sound waves reflected from all the objects in the illuminated object field 14. The hydrophone 15 develops a voltage signal which is similarly proportional to the intensity of the sound waves reflected from objects in the object field 14. The derived voltage signals are amplified by the amplifier $22a-22n$ and the amplifier 24 and thereafter separated into their constituent frequency components by the filter circuits 26a'-26a''''',-26n'-26n''''' and the filter circuits 28n. Initially, the components of the derived voltage signals having frequencies ranging from 20 to 21 kHz. are sequentially transmitted by the gate circuits 30a'-30n' by virtue of the enabling signals supplied to the appropriate input terminals of the gates by the hydrophone counter 36 and the hydrophone ring counter 38. These signals are then supplied to a mixer circuit 46 and combined therein with selectively out-of-phase reference signals transmitted by the gate 32a and phase shifted by the circuit 52. The joint intensity signals produced in the mixer circuit 46 are thereafter detected and DC control signals are supplied to the auxiliary deflection plates of an electron beam assembly 58. The vertical and horizontal deflection plates of the electron beam assembly 58 are supplied with sine and cosine voltage signals 68 and 70 developed by a pair of oscillators 42 and 44, the amplitudes of which correspond to the frequencies of the transmitted signals. The signals are thereafter recorded in a circular pattern 74a on the thermoplastic film 60.

Following the recordation of the component signals having frequencies ranging between 20 and 2 kHz., the components having frequencies in the range from 21 to 22 kHz. are recorded in a slightly larger circular array 74b on the thermoplastic film 60. The increase is implemented by the count converter 66 which supplies a control signal to the oscillators 42 and 44 which is proportional to the count accumulated in the hydrophone ring counter 38. Accordingly, all the different frequency components are recorded in circular arrays 74a-74 on the thermoplastic film 60, with the sizes of the arrays increasing in accordance with the increases in the frequencies of the signals transmitted by the gate circuits 30a'-30a''''',-30n'-30n'''''.

Figure 4:
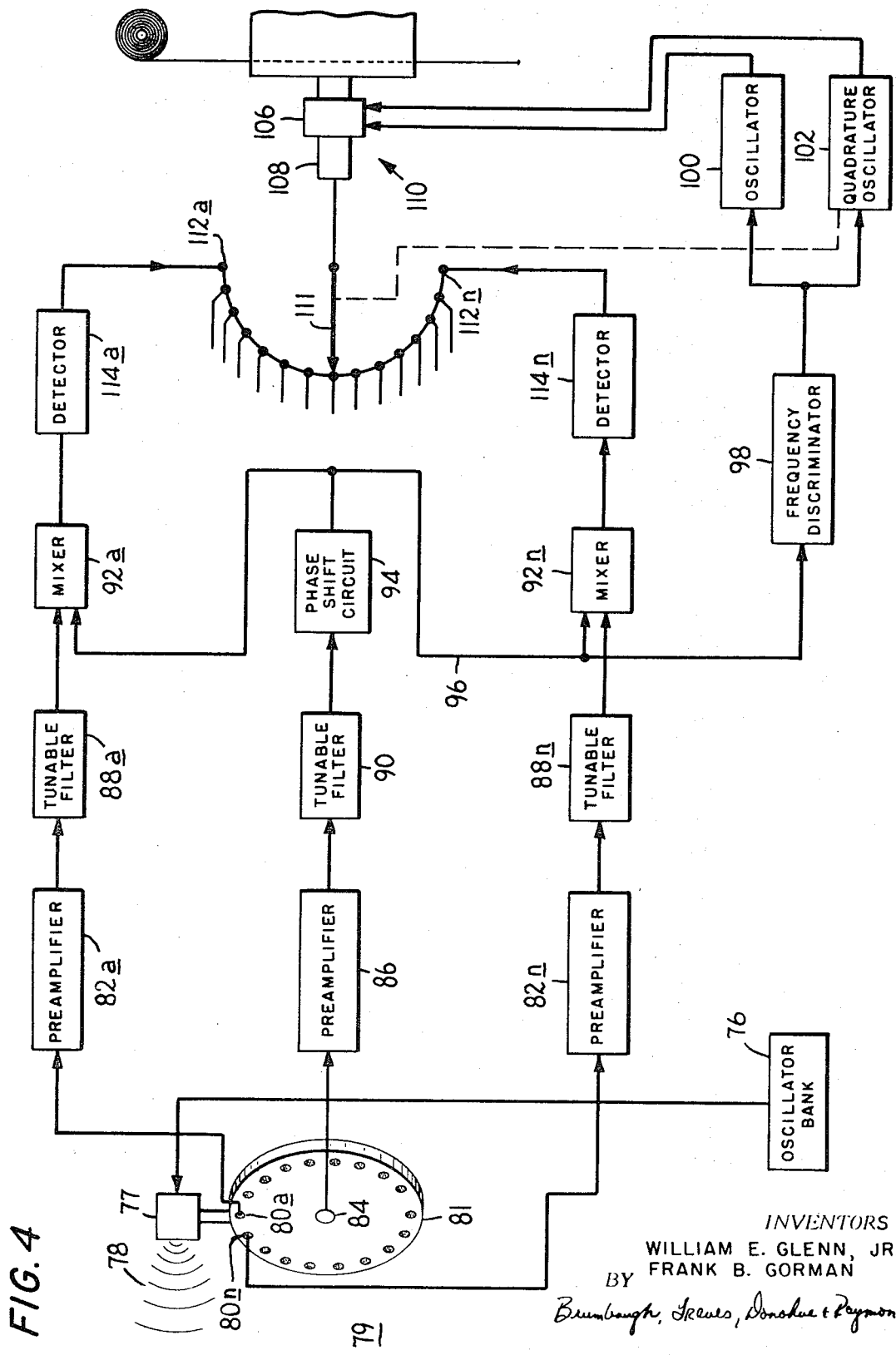
FIG. 4 illustrates schematically another representative sonography system arranged according to the present invention.

In a second representative sonography system arranged according to the present invention, as shown in FIG. 4, an oscillator bank 76 supplies multiple frequency signals to a transducer 77 which emits acoustic wave beams 78 having frequency components ranging from 20 to 200 kHz. The acoustic waves reflected from a plurality of object points in an object field 79 are recorded by a plurality of hydrophones 80a-80n, arranged in a circular array 81, and supplied as voltage signals to a corresponding plurality of preamplifiers 82a-82n, Preferably, the array 81 comprises 1000 centrally hydrophones arranged in a circle. Also provided is a centrally disposed hydrophone 84 which is responsive to multiple frequency reflected waves and supplies a corresponding voltage signal to a preamplifier 86.

The voltage signals amplified by the preamplifiers 82a-82n and the amplifier 86 are supplied to a corresponding plurality of tunable filter circuits 88a-88n and to a tunable filter 90. The tunable filter circuits 88a-88n and the tunable filter circuit 90 may be of conventional construction and, accordingly, need not be described herein. It suffices that each of the filter circuits scans incrementally the frequency range between 20 and 200 kHz. to selectively transmit the different frequency components of the developed voltage signals. Specifically, the tunable filters are adapted to first transmit signals in the frequency range between 20 and 21 kHz. and thereafter to successively transmit the components having frequencies ranging from 21 to 200 kHz.

Coupled to the output terminals of the tunable filter circuits 88a-88 are a corresponding plurality of mixer circuits 92a-92. The other input terminals of the mixer circuits 92a-92 are coupled together and to the output terminal of a phase shift circuit 94 via a conductor 96. The input terminal of the phase shift circuit 94 is connected to the tunable filter circuit 90. As above described with reference to FIG. 1, the phase shift circuit 94 selectively shifts the phase of the signal developed by the centrally disposed hydrophone 84 to provide an angular reference signal for subsequent combination with the voltage signals transmitted by the filter circuits 88a-88n. As above-described, the reference signal developed by the phase shift circuit 94 corresponds to the angular reference light beam employed to record holograms. In the mixer circuits 92a-92n, the frequency components of the developed voltage signals are combined with the corresponding frequency components of the reference signal to produce joint intensity signals which correspond to the convergence of the light reference beam and image-carrying light beam in light optical holography.

The conductor 96 also supplies the reference signal to the input terminal of a frequency discriminator 98 which develops a control signal having an amplitude which corresponds to the frequency of the voltage signal transmitted by the tunable filter 90. In particular, the frequency discriminator 98 produces a DC control signal having an amplitude which varies in accordance with the variation in frequency of the components transmitted by the filter 90. As the frequencies of the signals transmitted by the tunable filter circuit 90 increase, the amplitude of the DC control signal generated by the discriminator 98 increases.

Figure 5:
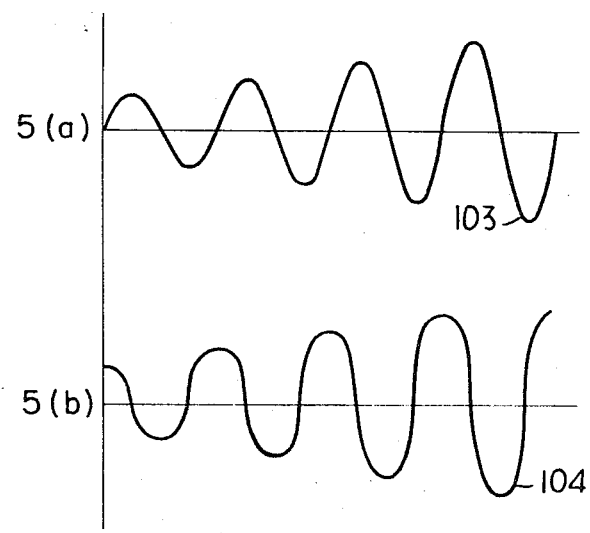
FIG. 5 illustrates graphically wave forms useful in explaining the operation of the FIG. 4 embodiment of the invention.

The control signal developed by the discriminator 98 is supplied concurrently to a pair of oscillators 100 and 102 which operate in phase quadrature to produce sine and cosine voltages 103 and 104, respectively (FIG. 5). Preferably, the oscillators may be adjusted to operate at a nominal frequency of 670 cycles per second. As shown in FIGS. 5(1) and 5(b), the sine and cosine signals 103 and 104 respectively increase in amplitude during each successive one-half cycle in accordance with the increase in amplitude of the DC control signal generated by the discriminator 98. From the oscillators 100 and 102, the sine and cosine signals are supplied to the deflection plates of the yoke 106 of an electron beam assembly 108 comprising an integral component of a recording apparatus 110.

Figure 6:
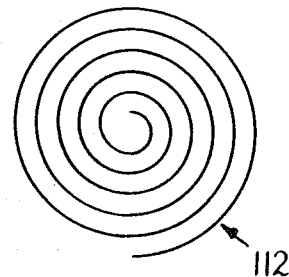
FIG. 6 illustrates graphically the sonograms recorded on film by the FIG. 4 sonography system.

The input anode electrode, or as above described the auxiliary deflection plates of the electron beam assembly 108, are connected to a rotary switch 111 which may be rotated at a frequency of 670 cycles per second and sequentially engages each one of a plurality of contacts 112a-112n for approximately 1.5 microseconds. The contacts 112a-112n are connected to the output terminals of a corresponding plurality of detector circuits 114a-114n. The input terminal of the detector circuits 114a-114n are coupled to the mixer circuits 92a-92 and develops DC signals having amplitudes which are proportional to the magnitude of the joint intensity signals produced by the mixer circuits 92a-92n. Initially, the rotary switch 111 samples the detected joint intensity signals developed by the mixer circuits 92a-92n having frequency components within a frequency range between 20 and 21 kHz. Each of the signals is sequentially supplied to either the beam intensity control input or to the auxiliary deflection plates of the electron beam assembly 108 and the electron beam caused to impinge on a thermoplastic film 114 in a spiral pattern 112 as shown in FIG. 6.

AS above-mentioned, the switch 111 rotates at a frequency of 670 cycles per second and the frequency of the sine and cosine signals 103 and 104 is 670 cycles per second. Accordingly, a complete circular scan by the electron beam in the electron beam assembly 108 takes place in the time it takes to scan the outputs, in a particular frequency, of the detector circuits 114a-114n. Because of the ever increasing amplitudes of the sine and cosine signals, the joint intensity signals which differ in frequencies are recorded in the spiral arrangement 112 on the thermoplastic film. This recording constitutes a sonogram which is the sound equivalent of a light optical hologram. Accordingly, to reconstruct the recorded image, a laser beam may be employed to illuminate the film at a predetermined angle. The reconstructed image may then be recorded and/or viewed by an observer.

Although the invention has been described herein with reference to particular embodiments, many modifications and variations therein will readily occur to those skilled in the art. Accordingly, all such modifications and variations are included within the intended scope of the invention as defined by the following claims.

We claim:

1. A sonography system comprising a plurality of sound intensity receptors arranged in a selected array and responsive to multiple frequency acoustic waves in an object field for developing signals corresponding to the intensities of the waves; means for separating the different frequency components of the developed signals; means responsive to the separated frequency component signals developed by a selected one of the sound intensity receptors for selectively shifting the phase thereof to produce angular reference signals; means for sequentially combining the different frequency component angular reference signals with each of the other separated frequency component signals having the same frequencies to produce joint intensity signals; and recording means, the recording means including storage means and means responsive to the joint intensity signals for recording the signals on the storage medium in arrays which correspond to the array of sound intensity receptors and which are dimensioned in accordance with the frequencies of the joint intensity signals.

2. A system according to claim 1 further comprising acoustic wave transmitter means for illuminating an object field with acoustic waves having different frequencies and wherein the plurality of sound intensity receptors are responsive to the acoustic waves reflected off objects in the illuminated object field for developing signals corresponding to the intensities of the reflected waves.

3. A system according to claim 2 wherein the recording means comprise means responsive to the joint intensity signals for recording the signals on the storage medium in arrays which correspond to the array of sound intensity receptors and at substantially reduced scales with respect thereto, the extents of the reductions in scale decreasing as the frequencies of the joint intensity signals increase.

4. A system according to claim 2 further comprising scanning means including first means responsive to the separated frequency component signals developed by the selected one of the sound intensity receptors for sequentially transmitting the different frequency components thereof and second means successively responsive to each of the other separated frequency component signals having different frequencies for sequentially transmitting the component signals developed by the other sound intensity receptors having the same frequency.

5. A system according to claim 2 further comprising signal generating means for producing signals having different frequencies and for supplying the multiple frequency signals to the acoustic wave transmitter means to cause said wave transmitter means to produce acoustic waves having different frequencies.

6. A system according to claim 5 wherein the separating means comprises a plurality of filter means operatively coupled to each of the sound intensity receptors and further including scanning means, the scanning means comprising a corresponding plurality of gate means coupled to each plurality of filter means, first counter means operatively coupled to the signal generating means for developing sound intensity receptor signals at a selected frequency and for supplying said signals sequentially to each plurality of gate means, except the plurality of gate means responsive to the different frequency component angular reference signals, to scan the pluralities of gate means to implement the sequential transmission of the component signals having the same frequency and second counter means responsive to periodic signals developed by the first counter means following each scan of the plurality of gate means by the first counter means for supplying sound intensity ring signals to selected gate means in each plurality of gate means to implement the sequential transmission of the component signals having different frequencies.

7. A system according to claim 6 wherein the phase shifting means is responsive to the sequentially transmitted different frequency component angular reference signals and wherein the combining means comprises mixer circuit means responsive to the phase shifted reference signals and to the signals sequentially transmitted by the pluralities of gate means for producing joint intensity signals.

8. A system according to claim 7 wherein the storage medium of the recording means comprises thermoplastic film and wherein the recording means comprises means for heating the thermoplastic film, electron beam assembly means responsive to the joint intensity signals for controlling the deflection of the electron beam produced by the assembly as it impinges the thermoplastic film 9. A system according to claim 8 wherein the electron beam assembly means comprises primary deflection means, including vertical and horizontal deflection means for focusing the electron beam onto the thermoplastic film, and further comprising oscillator means for supplying sine and cosine signals to said horizontal and vertical deflection means, respectively, to focus the electron beam onto the thermoplastic film and an arcuate pattern.

10. A system according to claim 9 further comprising converter means coupled to the stages of the second counter means and responsive to the count accumulated therein for supplying control signals having periodically increasing amplitudes to the oscillator means and wherein the oscillator means produces sine and cosine signals having amplitudes which increase in accordance with the periodic increases in amplitude of the control signal.

11. A system according to claim 2 wherein the separating means comprises tunable filter means for separating and sequentially transmitting the different frequency components of the developed signals.

12. A system according to claim 11 wherein the phase shifting means is responsive to the signals separated by a selected one of said tunable filter means and selectively shifts the phase thereof to produce angular reference signals and wherein the combining means comprises a plurality of mixer circuits, one of said circuits being responsive to the angular reference signals and the remaining circuits being responsive to the angular reference signals and the remaining circuits being responsive to the signals sequentially transmitted by the remaining tunable filter means for simultaneously producing joint intensity signals having the same frequencies.

13. A system according to claim 12 further comprising sound intensity receptor scanning means for sequentially scanning the simultaneously produced joint intensity signals and for supplying said signals to the recording means.

14. A system according to claim 13 wherein the storage medium of the recording means comprises thermoplastic film and wherein the recording means comprises means for heating the thermoplastic film, an electron beam assembly responsive to the joint intensity signals for controlling the deflection of the electron beam produced by the assembly as it impinges the thermoplastic film.

15. A system according to claim 14 wherein the electron beam assembly comprises primary deflection means including vertical and horizontal deflection means and further comprising discriminator means responsive to the frequencies of the signals transmitted by the plurality of tunable filter means for developing control signals having amplitudes which increase in accordance with the increases in frequency of the transmitted signals, and oscillator means responsive to the control signals for supplying sine and cosine signals continuously increasing in amplitude to the horizontal and vertical deflection means whereby the electron beam is focused in a spiral pattern on the thermoplastic film.

* * * * *

PO-1050
(5/69)

UNITED STATES PATENT OFFICE
CERTIFICATE OF CORRECTION

Patent No. __3,617,994__  Dated __November 2, 1971__

Inventor(s) __William E. Glenn, Jr. and Frank B. Gorman__

It is certified that error appears in the above-identified patent and that said Letters Patent are hereby corrected as shown below:

First Page, after "Patented Nov. 2, 1971" insert --Assignee Columbia Broadcasting System, Inc., New York, N.Y.--;
Column 1, line 22, "the reafter" should be --thereafter--;
Column 3, line 7, "-26n-'''''" should be -- -26n'-26n'''''--;
same line, "28a' 28n" should be --28a-28n--;
line 15, "26a'-26a'ᵀ''',-26n'''''" should be --26a'-26aᵀ''''',-26n'-26nᵀ''''--;
line 16, "30a'-30a'''ᵀ'-30n'''''" should be --30a'-30aᵀ''''',-30n'-30n''''--;
line 20, "30a'-30a'''ᵀ'" should be --30a'-30a'''',-30nᵀ-30nᵀ''''--;
line 54, "-30n-30n'''''" should be -- -30n'-30n''''--;
line 61, after "understood" insert a period --(.)--;
Column 4, line 31, "traNsmit" should be --transmit--;
line 57, "10a-10" should be --10a-10n--;
line 60, after "hereinbelow" insert a period --(.)--;
Column 5, line 62, after "36." delete --X--;
line 69, after "60." delete --X--;
line 73, "30a'-30a'''''-30n'-30n'''''" should be --30a'-30aᵀ''''',-30n'-30nᵀ''''ᵀ--;
Column 6, line 23, delete "yokeᵀ" and substitute therefor --the--;
line 51, "74a-74" should be --74a-74n--;
line 54, "ITᵀ" should be --It--;
Column 7, line 2, "28n" should be --28a-28n--;
line 30, "74a-74" should be --74a-74n--;
line 42, after "82a-82n" insert a period --(.)--;
line 43, after "1000" delete --centrally--;
line 59, after "kHz." insert a comma (,)--;
line 63, "88a-88" should be --88a-88n--;
line 64, "92a-92" should be --92a-92n--;
line 65, "92a-92" should be --92a-92n--;
Column 8, line 24, "5(I)" should be --5(a)--;
line 43, "92a-92" should be --92a-92n--;
line 53, "ASᵀ" should be --As--;
Column 10, line 14, after "film" insert a period --(.)--.

Signed and sealed this 8th day of August 1972.

(SEAL)
Attest:

EDWARD M.FLETCHER,JR.  ROBERT GOTTSCHALK